UNITED STATES PATENT OFFICE

HAROLD T. STOWELL, OF BUFFALO, NEW YORK, ASSIGNOR TO NATIONAL ANILINE & CHEMICAL CO., INC., OF NEW YORK, N. Y., A CORPORATION OF NEW YORK

PURIFICATION OF DIAMINO-ALPHA-ALPHA'-DIHYDROXY-ANTHRAQUINONE DISULPHONIC ACID DYESTUFFS

No Drawing.  Application filed February 13, 1926. Serial No. 88,140.

This invention relates to the purification of crude or impure diaminodihydroxyanthraquinone disulphonic acids, particularly diaminoanthrarufine disulphonic acid and diaminochrysazine disulphonic acid, or a mixture of the same, and which have respectively the following probable formulae:

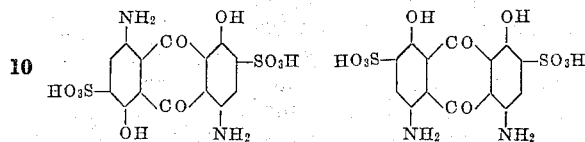

In the production of the dyestuffs represented by diaminoanthrarufine disulphonic acid, particularly in admixture with diaminochrysazine disulphonic acid, by well-known methods, and more especially by the reduction of a mixture of the dinitrodisulphonic acids of anthrarufine and chrysazine by means of an ammonium or alkali metal sulfide in alkaline solution, the resulting product is ordinarily impure, and dyes wool relatively dull and undesirable shades. This is more particularly so when the mixture of dinitrodisulphonic acids has been produced by the sulphonation of commercial anthrarufine and the direct nitration of the sulphonation mixture thus obtained, followed by dilution of the resulting nitrated mixture, salting of the dinitrodisulphonic acids, and filtering off of the resulting dinitrodisulphonic acid salts.

According to the present invention, the purification of an impure diaminoanthrarufine disulphonic acid dyestuff is effected by treating the impure dyestuff in aqueous solution or suspension with a dilute acid, e. g., sulphuric acid. The impurities, or a portion of them, are removed by solution in the dilute acid, they being more soluble than the dyestuff. The invention particularly contemplates the purification by treatment with dilute acid of an impure diaminoanthrarufine disulphonic acid dyestuff which has been produced by the successive sulphonation, nitration and reduction of technical anthrarufine, the reduction step having been carried out in an alkaline medium by the action of an alkali metal sulphide on the isolated dinitroanthrarufine disulphonic acid obtained by slowly salting the diluted and filtered sulphonation-nitration mixture.

The following specific example will further illustrate the invention, but it will be understood that the invention is not limited thereto. The parts are by weight.

*Example.*—One part of impure diaminoanthrarufine-disulphonic acid as paste in the form of its sodium salt and which has been obtained, for example, by sulphonating technical anthrarufine to the disulphonic acid, treating the sulphonation mass thus obtained with a nitric-sulphuric acid mixture to form the dinitrodisulphonic acid, diluting the reaction mixture, salting the diluted solution by means of sodium chloride, and reducing the resulting sodium salt of the crude dinitrodisulphonic acid in alkaline solution by the action of sodium sulphide, is suspended in 18 to 25 parts of water and heated with stirring to about 60°–70° C. for about 15 to 30 minutes, or more. One part of 100 percent sulphuric acid, or its equivalent, is then added, the stirred solution is heated for an additional 15 to 30 minutes or so, then cooled (preferably over a period of 2 to 3 hours) to 15°–30° C., and the purified dyestuff is filtered off. A part or all of the impurities remain in solution. They may be precipitated and recovered by neutralizing the filtrate or by salting out by means of common salt, or both.

In the above example, the conditions and quantities of reagents, etc., may be varied largely without departing from the spirit or scope of the invention. For example, the strength of the diluted acid may vary from 1 or 2 percent to about 50 or 60 percent, but preferably a 4 to 5 percent solution is employed. Other acids, such as hydrochloric acid, etc., may be used in place of sulphuric acid, but the latter is preferred. While strong acid e. g., 50 to 60 percent sulphuric acid effects a purification, it also tends to retain a portion of the diaminochrysazine disulphonic acid in solution.

The above process is applicable to the purification of an impure diaminoanthrarufine disulphonic acid or an impure diaminochrysazine disulphonic acid. Accordingly the term diamino-α.α'-dihydroxyanthraquinone disulphonic acid dyestuff, as used in the claims, intends to cover these isomers separately or in admixture either in the form of the free acid or in the form of salts.

I claim:

1. A method of purifying an impure diamino-α.α′-dihydroxyanthraquinone disulphonic acid dyestuff, obtained by reducing the corresponding dinitro compound in an alkaline medium, which comprises extracting impurities therefrom by treating it with dilute mineral acid.

2. A method of purifying an impure diamino-α.α′-dihydroxyanthraquinone disulphonic acid dyestuff, obtained by reducing the corresponding dinitro compound in an alkaline medium, which comprises suspending the impure dyestuff in a heated acid medium, containing from about 1 to about 50 percent of mineral acid, cooling, and separating the undissolved dyestuff.

3. A method of purifying an impure diamino-α.α′-dihydroxyanthraquinone disulphonic acid dyestuff, obtained by reducing the corresponding dinitro compound in an alkaline medium, which comprises heating it with dilute sulphuric acid, cooling, and separating the undissolved dyestuff.

4. A method of purifying an impure diamino-α.α′-dihydroxyanthraquinone disulphonic acid dyestuff which comprises digesting it with sulphuric acid of about 4 to 5 percent strength at a temperature of about 60°–70°C., and subsequently cooling the mass to about 15°–30° C. and recovering the purified dyestuff.

5. In the purification of an impure diamino-α.α′-dihydroxyanthraquinone disulphonic acid dyestuff, obtained by reducing the corresponding dinitro compound in an alkaline medium, a process which comprises treating the impure dyestuff with a mineral acid of not more than 50 to 60% strength.

6. In the purification of an impure diamino-α.α′-dihydroxyanthraquinone disulphonic acid dyestuff, obtained by reducing the corresponding dinitro compound in an alkaline medium, a process which comprises treating the impure dyestuff with sulphuric acid of not more than 50 to 60% strength.

7. A method of purifying an impure diamino-α.α′-dihydroxyanthraquinone disulphonic acid dyestuff, obtained by reducing the corresponding dinitro compound in an alkaline medium, which comprises heating it with a dilute mineral acid at a temperature of about 60°–70° C., and subsequently cooling the mass to about 15°–30° C. and recovering the purified dyestuff.

8. A method of purifying an impure diamno-anthrarufine disulphonic acid dyestuff, containing diamino-chrysazine disulphonic acid and obtained by reducing the corresponding dinitro compound in an alkaline medium, which comprises heating said dyestuff with sulphuric acid of from 1 to 5 per cent strength, cooling, and separating the undissolved dyestuff.

9. A method of purifying an impure diamino-anthrarufine disulphonic acid dyestuff, containing diamino-chrysazine disulphonic acid and obtained by reducing the corresponding dinitro compound with an alkali metal sulphide in an alkaline medium, which comprises treating the impure dyestuff with a mineral acid of not more than 50 to 60 per cent strength.

10. A method of purifying an impure diaminoanthrarufine disulphonic acid dyestuff, containing diaminochrysazine disulphonic acid and obtained by reducing the corresponding dinitro compound in an alkaline medium, which comprises heating said dyestuff with a mineral acid of from 1 to 5 per cent strength, then cooling the mass, and separating the undissolved dyestuff.

11. A method of purifying an impure diaminoanthrarufine disulphonic acid dyestuff, containing diaminochrysazine disulphonic acid and obtained by reducing the corresponding dinitro compound with sodium sulphide in an alkaline medium, which comprises digesting said dyestuff with sulphuric acid of about 4 to 5 per cent strength at a temperature of about 60 to 70° C., subsequently cooling the mass to about 15 to 30° C., and recovering the purified dyestuff.

In testimony whereof I affix my signature.

HAROLD T. STOWELL.